United States Patent [19]

Tronstad

[11] 4,122,208
[45] Oct. 24, 1978

[54] METHOD AND AN APPARATUS FOR PRODUCING AND DRYING A MEAL OF COOKED ANIMAL MATERIAL, ESPECIALLY FISH AND FISH PULP

[75] Inventor: Inge Magnus Tronstad, Asker, Norway

[73] Assignee: Myrens Verksted A/S, Oslo, Norway

[21] Appl. No.: 786,856

[22] Filed: Apr. 12, 1977

[30] Foreign Application Priority Data

Apr. 14, 1976 [NO] Norway ........................... 761323

[51] Int. Cl.² ...................... A22C 25/00; A22C 17/00
[52] U.S. Cl. ........................................ 426/641; 34/12; 34/61; 426/646; 426/473; 426/643; 426/464
[58] Field of Search .............. 426/442, 455, 456, 464, 426/467, 470, 472, 473, 495, 478, 453, 285, 388, 294, 302, 643, 646, 641; 34/12, 60, 61; 100/104, 95, 131; 99/516, 483; 209/138, 139 R

[56] References Cited

U.S. PATENT DOCUMENTS

| | | | |
|---|---|---|---|
| 518,748 | 4/1894 | Waage | 426/473 X |
| 2,019,507 | 11/1935 | Roller | 209/139 R |
| 2,082,555 | 6/1937 | Smith | 426/473 X |
| 2,899,139 | 8/1959 | Hardinge | 209/138 X |
| 3,042,526 | 7/1962 | Spiess et al. | 426/453 X |
| 3,359,115 | 12/1967 | Lanz | 426/643 X |
| 3,369,908 | 2/1968 | Gowzalez et al. | 99/483 X |
| 3,929,628 | 12/1975 | Dekevi et al. | 209/138 X |

OTHER PUBLICATIONS

Arsdel et al.; Food Dehydration, vol. 2, Ed. 2, 1973; The AVI Publishing Co., Inc., p. 284.

*Primary Examiner*—Kenneth M. Schor
*Attorney, Agent, or Firm*—Holman & Stern

[57] ABSTRACT

In a method and an apparatus for producing and drying a meal of cooked or heat treated animal material, especially fish or fish pulp, the cooked fish pulp is pressed for separation of liquid. After centrifuging and concentration, if desired, the separated liquid is added to the fish pulp during the drying thereof. The cooked and pressed pulp is disintegrated to meal particles before it is subjected to the drying process. By means of hot drying air the meal particles are transported through a drying device consisting of substantially vertically arranged riser and down pipes. In a transition area between associated riser and down pipes, the liquid concentrate is added to the meal particles, said concentrate being entrained by the stream of meal and air for mixing with and drying together with the meal particles to a finished dried meal.

9 Claims, 1 Drawing Figure

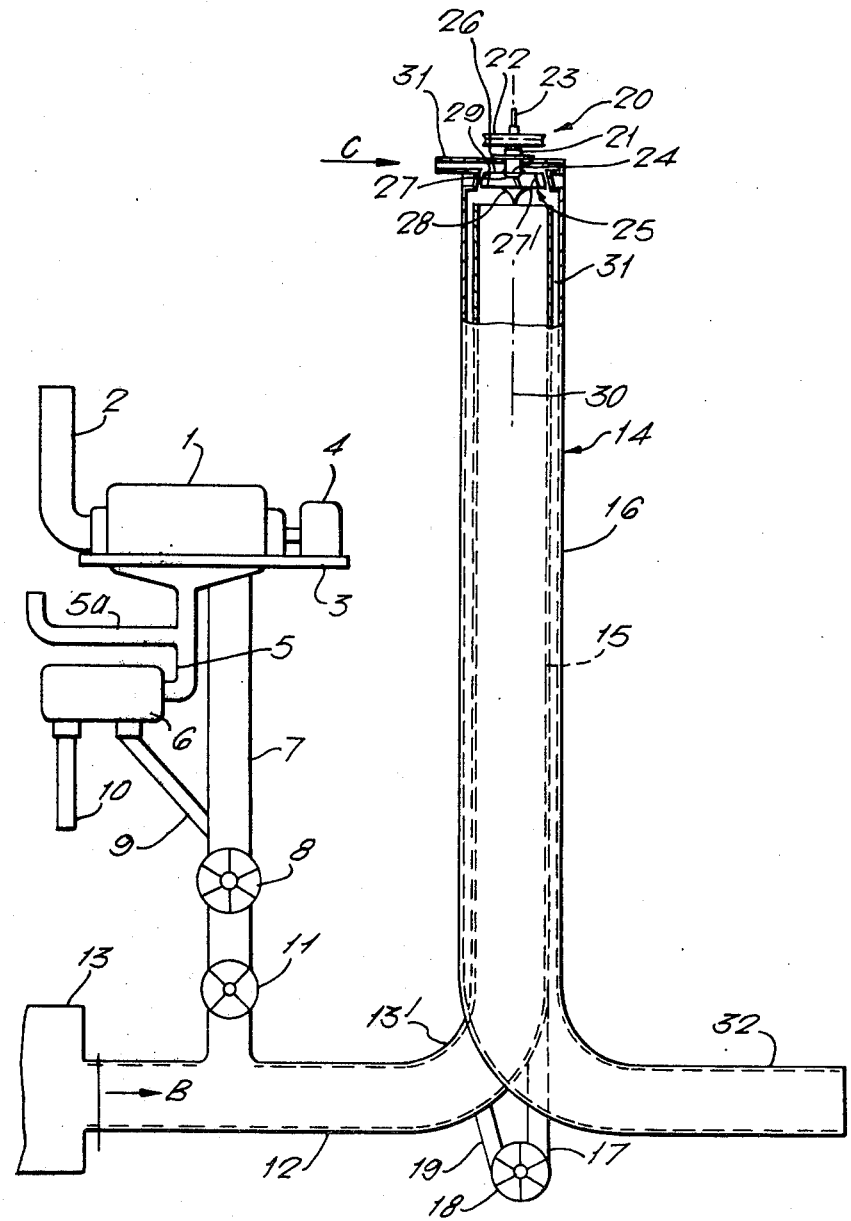

METHOD AND AN APPARATUS FOR PRODUCING AND DRYING A MEAL OF COOKED ANIMAL MATERIAL, ESPECIALLY FISH AND FISH PULP

BACKGROUND OF THE INVENTION

The present invention relates to a method of producing and drying a meal of cooked animal material, especially fish or fish pulp, the cooked fish pulp being pressed for separation of liquid and the separated liquid after centrifuging and concentration, if desired, being added to the fish pulp during the drying thereof.

In the production of fish oil and fish meal the raw material is first cooked, i.e. it is heated to such a temperature as to coagulate the proteins, whereupon the cooked pulp is pressed and dried. The separated liquid is centrifuged for separation of oil, and the remaining separator liquid, called stick water, is usually concentrated in an evaporating plant. The concentrate is mixed with the pressed pulp during the drying thereof.

In the drying process to which the meal is subjected, it is important that the drying time for the meal is as short as possible and that the drying takes place at a relatively low temperature, so that the quality of the meal and the nutritious matter thereof is degraded as little as possible.

DESCRIPTION OF THE PRIOR ART

In a known drying process there is used a horizontal rotating drum into which the pulp is introduced, and the drying is effected by direct contact with added gas having a relatively high temperature, e.g. 400°–700° C. The pulp is advanced by the turning of the drum, and by appropriate means provided in the drum the pulp will during the turning movement be disintegrated to a suitable meal structure. The meal is advanced through the drum in the same direction as the drying gas.

In another known drying process an indirect steam heating is used. A drying device for this process consists of a horizontal cylinder enclosing a rotor composed of pipes. In this case, the feed pulp is disintegrated or finely divided to a meal structure by means of suitably positioned vanes or blades mounted on the rotor. The drying of the meal is effected by contact between the meal and the hot pipe surfaces, and the meal is advanced through the drying device by specific conveying means which are provided on the rotor, and which may at the same time also constitute the above mentioned disintegrating means.

These drying processes have in common that the meal is subjected to a very high temperature and also that the residence time of the meal in the drying device becomes relatively long. As a lengthy treatment of animal material at high temperatures leads to an appreciable degrading of the quality of the meal, e.g. by denaturation of digestible proteins, destruction of vitamins etc., miscolouring and other effects, the known drying devices are thus less suited for the drying of fish meal, such known drying apparatus having a complicated design and being difficult to clean to meet the standards in the production of meal for human consumption as well as for animal foodstuff.

SUMMARY OF THE INVENTION

An object of the present invention is to give directions for a method and an apparatus for drying pressed pulp and stickwater concentrates (fish solubles), in which the mentioned disadvantages are reduced to a minimum. In other words, the invention aims at providing a method and an apparatus which will result in a more rapid drying, at the same time subjecting the goods to be dried to a lower temperature.

Further, the invention aims at providing a drying apparatus which is simple and economic to build, occupies a small volume, requires little service and maintainance, is easy to clean, and is hygienic and economic in operation.

In a method of the type referred to, these objects and aims are, according to the invention, achieved by (a) desintegrating the cooked and pressed pulp to meal particles before it is subjected to the drying process, (b) transporting the meal particles by means of hot drying air through a drying device consisting of substantially vertically arranged riser and down pipes, and, (c) adding concentrated liquid to the meal particles in a transition area between associated riser and down pipes, said concentrate being entrained by the stream of meal and air for mixing with and drying together with the meal particles to a finished dried meal.

At the end of the process the meal, the concentrated liquid and the hot air constitute a mixture of dried meal and air having a temperature of approximately 100° C. The dry meal and the air are thereupon separated in a cyclone as a final step in the process.

Due to the thermodynamic balance between the humid meal and the drying air the temperature of the meal during the entire drying process will be substantially below the temperature of the drying air at the end of the process.

An apparatus for the carrying out the present invention is according to the invention characterized in that it comprises (a) a pulp disintegrator for disintegrating the pressed pulp to a particle size suitable for conveyance by blowing air, (b) a drying device consisting of one or more riser and down pipes arranged in pairs, (c) a hot-air generator for generating and blowing heated drying air for conveyance and drying of the disintegrated pulp, said pulp disintegrator, drying device and hot-air generator being so arranged in relation to each other that the ground pulp at the outlet of the pulp disintegrator is caught by the drying air and is transported thereby into the drying device, and (d) a device for injecting and atomizing the concentrated liquid, said device preferably being positioned in a transition area between associated riser and down pipes of the drying device.

Conveniently a rotating sluice for feeding the disintegrated pulp to the infeed area of the drying device is provided between the disintegrator and the drying device.

In a preferred embodiment of the apparatus according to the invention, a collecting pipe for collecting the particles which are too large to be conveyed by the drying air, is provided in the lower portion of the riser pipe located adjacent to the infeed area of the drying device, said collecting pipe leading to a secondary disintegrator for further disintegration of the collected pulp particles, which through a return pipe are passed back to the infeed area of the drying device.

BRIEF DESCRIPTION OF THE DRAWING

The invention will in the following be further described, reference being had to the drawing, which illustrates an embodiment of the apparatus designed in accordance with the teachings of the present invention.

DETAILED DESCRIPTION OF A PREFERRED EMBODIMENT

In the drawing 1 designates a centrifugal press to which cooked fish pulp, e.g. in the form of a pulp plug, is delivered through a supply conduit 2. In the centrifugal press 1, which is mounted in a frame 3 and is driven by an electric motor 4, the cooked fish pulp is pressed for separation of stickwater and oil. The separated liquid is removed from the centrifugal press through a conduit 5 which is connected to a decanter 6 for separation of the precipitate from the pressed liquid. A branch conduit 5a from the conduit 5 conveys a part of the pressed liquid back to a cooking apparatus (not shown), which e.g. may be of the the type described in Norwegian Patent application No. 75 2467.

The pressed raw material pulp is removed from the centrifugal press 1 through a pipe 7 which is connected to a main disintegrator 8. A pipe 9 which leads from the decanter 6 and discharges the precipitate therefrom, is connected to the pipe 7 ahead of the main disintegrator 8. A second pipe 10 from the decanter 6 conveys overflow oil and stickwater to a centrifugal separator (not shown), in which the extracted liquid is centrifuged for separation of oil. The remaining liquid, also called stickwater, is then concentrated in an evaporizing plant (not shown), and the concentrate is later mixed with the humid meal during the drying process, as will be explained below.

The disintegrator 8 serves to disintegrate the pressed pulp to a particle size which is suitable for conveyance by blowing air. After the pulp has passed the main disintegrator, it has a wet meal structure. It then passes through a cell feeder 11, whereupon it is conveyed into a conveyor pipe 12 which at one end is connected to a hot-air generator 13 for generation and discharge of heated air for drying and conveyance, as indicated by the arrow B in the drawing.

At the other end the conveyor pipe 12 forms a bend 13' which defines the infeed area to a drying device or a drying tower 14 consisting of two vertical concentric pipes, an inner riser pipe 15 and an outer down pipe 16, respectively.

In the area of the pipe bend 13', preferably at the point where the bend continues into the riser pipe 15, there is provided a collecting pipe 17 which leads to a secondary disintegrator 18. Between the disintegrator and the pipe bend 13' a return pipe 19 is provided.

At the top of the down pipe 16 there is provided a device generally designated by 20 for injection of stickwater concentrate. This device consists of a shaft 21 which is mounted for rotation by a power transmission (not shown) leading to a pully 22, conveniently mounted on the same shaft. The shaft 21 is provided with an inner bore (not shown) through which is inserted a supply pipe 23 for concentrated stickwater. The supply pipe 23 is shown at the top of the shaft 21, but it is to be understood that it extends through the shaft and opens at the lower end 24 thereof. At the lower end 24 of the shaft 21 there is mounted a distribution means 25 having an upper end surface 26 facing the shaft 24 and having a recess 27 for the collection and distribution of the concentrated stickwater supplied through the pipe 23. The end surface 26 of the distribution means 25 merges with a downwardly diverging inclined lateral surface 27' encircling a stationary conical member 28, the apex of which only just entering the upper end of the riser pipe 15. The member 28 serves to give the rising drying air a suitable deflection.

The inclined surface 27' of the distribution means 25 carries blower vanes 29 which are rotated with the means 25 about the longitudinal axis 30 of the drying tower.

When the distribution means 25 is rotated and concentrated liquid is simultaneously supplied thereto via the pipe 23, the liquid, which first collects in the recess 27, will be forced out through appropriate openings (not shown) at the junction between the shaft 21 and the end surface 26 of the distribution means. The liquid covers the end surface 26 as a thin liquid film and is deflected and atomized in the area of the inclined surface 27' and the vanes 29 of the means 25.

Adjacent to the injection device 20 there is also provided a supply pipe 31 for supplying secondary air, as indicated by the arrow C. This air may preferably be supplied from the above mentioned hot-air generator 13 via suitable pipes (not shown). During the rotation of the distribution means 25 the secondary air is conveyed from the pipe 31 and into the drying tower by means of the vanes 29 of the distribution means. The secondary hot air passes the inclined surface 27' and here it meets the thin liquid film, said secondary air being mixed therewith and with the remaining hot air in the drying tower. The vanes 29 also aid in giving the primary drying air passing along the injection device 20 a certain rotation about the longitudinal axis 30 of the drying tower.

The disintegrated pulp particles which are supplied to the conveyor pipe 12 through the cell feeder 11, are conveyed into the drying tower 14 by means of the drying air generated in and discharged from the hot-air generator 13. The mixture of pulp and air rises in the inner riser pipe 15. At the top thereof, i.e. adjacent the injection device 20, the mixture is deflected and sinks down in the annular chamber 31 defined between the inner riser pipe 15 and the down pipe 16.

It is to be understood that for the conveyance and drying process is is of paramount importance that the main disintegrator 8 finely disintegrates the raw material pulp to particles of dimensions providing a sufficiently low speed of fall (velocity of gravitational attraction), preferably lower than the velocity of the drying air in the riser pipe 15 of the drying tower 14.

In the conveyor pipe 12 the humid particle pulp meets a stream of hot air having a temperature of say 200° to 300° C., said air stream carrying the particles into the drying tower through the pipe bend 13'. The parts of the pulp which have been disintegrated sufficiently for the speed of fall of the particles to be less than the velocity of the air in the vertical riser pipe, will be conveyed through the drying tower 14 and out therefrom, while being rapidly dried.

The particles which are too large for being conveyed by air, will fall back towards the bend 13' and be collected in the collecting pipe 17 which conveniently forms a downward continuation of the riser pipe 15 and which collects the heavy particles and guides them into the secondary disintegrator 18, which again disintegrates the particles and via the return pipe 19 feeds them into the main stream of hot air in the conveyor pipe 12 by special blower throttles or a separate blower.

The recirculation device consisting of the collection pipe 17, the secondary disintegrator 18 and the return pipe 19, will process all the larger particles until the speed of fall thereof has become sufficiently low for the particles to rise in the vertical riser pipe 15, in which they are subjected to a sufficiently rapid drying to a desired moisture content.

At the top of the drying tower 14, where the mixture of pulp and air is subjected to a change of direction from vertically rising to vertically sinking, suitable quantities of concentrated stickwater are added to the stream, said concentrate in atomized form either settling on the meal particles or on the inside of the outer pipe wall in the area where the stream of meal and air is reversed.

The concentrated stickwater which covers the inner wall will be bombarded with meal particles due to centrifugal forces in the turning zone, resulting in a clearing of the inner wall of this area of any layer.

As previously mentioned, the injection device 20 may also be connected to a supply pipe for secondary air, which is supplied for example if the quantity of the injected concentrated stickwater is large or the stickwater has a relatively low solids content.

The mixture of meal, stickwater and hot air is conveyed through the remaining parts of the drying apparatus and eventually constitutes a mixture of dry meal and air having a temperature of approximately 100° C. The completely dried meal is removed through an outlet pipe 32 connected to the down pipe 16, whereupon the dry meal and the air are separated in a cyclone (not shown) connected to the outlet pipe 32.

Due to the thermodynamic balance between the humid meal and the drying air the temperatur of the meal during the complete drying process will be substantially below the temperature of the drying air at the end of the process. Thus, a drying process is achieved which heats the cooked and finely divided raw material pulp with a minimum reduction of the quality of the meal, the temperature of the meal being kept relatively low and the residence time in the drying tower being reduced to approximately one minute.

The advantages of the method and the apparatus according to the invention may be recapitulated in the following items:

1. The system provides a simple and easily controllable drying apparatus in which the velocity, volume, temperature etc. may be regulated in a simple manner.
2. The drying volume can be utilized to its full extent.
3. The disintegrated pulp is uniformly heated to a relatively moderate temperature, meaning that the nutritional degrading of the raw material due to the heat processing is kept at a minimum.
4. No direct contact between the pulp and hot surfaces having very high temperatures, i.e. no scale forming of the raw material on the various parts of the apparatus.
5. The design of the apparatus is simple and economic, the drying tower including no moving parts.
6. Due to the excellent utilization of the drying volume and the vertical arrangement of the drying tower or towers the apparatus requires a minimum of space.
7. The apparatus is easy to clean due to the simple geometric parts included therein.
8. The apparatus forms parts of a closed system with a minimum dissipation of smelling substances.

The apparatus according to the invention may, of course, be designed in other ways than the one described above, without departing from the scope of the invention. For example, the number of drying towers may be varied whilst maintaining the main principle of the apparatus, namely that the pressed pulp is disintegrated into small particles, fed into the drying apparatus through a sluice and transported by hot drying air through the apparatus, which primarily consists of vertically arranged riser and down pipes, concentrated stickwater being injected into the stream of hot air at appropriate points in the apparatus where the meal particles are partly dried.

If several drying towers are used, it is convenient to provide the injection device at the top of the first drying tower, and the first drying step should also be combined with the above mentioned system for recirculation and secondary disintegration of the particles, so that a congestion of larger particles at the inlet to the first drying tower is avoided.

In a modified embodiment of the invention the supply conduit for the raw material may be directly connected to the secondary disintegrator provided at the lower part of the riser pipe 15. The main disintegrator 8 may then be omitted, the secondary disintegrator 18 disintegrating both the raw material feed and the heavier pulp particles which are too large to be carried away through the riser pipe 15 by the stream of hot air.

What I claim is:

1. In the method of treating cooked animal material including the steps of pressing the cooked material for separation of liquid therefrom, separating out oil from said liquid, concentrating said liquid and adding said concentrated liquid to the cooked and pressed material during drying thereof, the improvement comprising
    (a) grinding the cooked and pressed material into meal particles before drying,
    (b) drying the meal particles by hot air while transporting the meal particles by said hot air through a drying device consisting of vertically extending riser and down pipes, the riser pipe being arranged coaxially within the down pipe to define a down passage therebetween so that the meal particles enter the riser and exit from the down pipes, and
    (c) atomizing said concentrated liquid and exposing the meal particles to said atomized concentrated liquid in a transition area between the riser and down pipes, in which area the particles are subjected to a change in direction from a rising to a falling condition.

2. A method as claimed in claim 1 including the step of collecting meal particles which are too large for being conveyed through the riser pipe by the drying air, at the bottom of the riser pipe for re-disintegration and re-entry to the riser pipe.

3. A method as claimed in claim 1 wherein the meal particles are supplied to the riser pipe while being subjected to a change of direction, by being passed through a pipe bend, whereby the heaviest of the particles follow paths having the largest radius of curvature of said bend and particles which are too heavy to be conveyed by the hot air, fall back into the bend along said paths, and wherein the heaviest of the particles are collected along said paths.

4. A method as claimed in claim 3, wherein said heaviest of the meal particles are collected in collecting pipes forming vertical extensions of a lower part of the riser pipe.

5. A method of treating cooked animal material which is pressed for separation of liquid therefrom, comprising the steps of:
  (a) disintegrating the cooked and pressed material into meal particles,
  (b) transporting the disintegrated material through a drying tower, consisting of vertically extending riser and down pipes, in a stream of hot drying air having a temperature of approximately 200°–300° C. so that the material enters the riser and exits from the down pipes.
  (c) introducing concentrated stick-water into the stream at the top of the drying tower, where the stream is subjected to a change of direction from a rising condition to a sinking condition,
  (d) conveying the resultant mixture of meal, stick-water and hot air through remaining parts of the drying tower for further drying of the meal particles and the stick-water, the meal and air leaving the drying tower at a temperature of approximately 100° C., and
  (e) separating the meal and the air in a cyclone connected to an outlet of the drying tower.

6. A method as claimed in claim 5 wherein the concentrated liquid is added to the stream of meal and air together with further quantities of hot air.

7. A method as claimed in claim 5, wherein the meal particles passing through the drying tower have a residence time of one minute.

8. A method as claimed in claim 5 including the step of collecting meal particles which are too large for being conveyed through the riser pipe by the drying air, at the bottom of the riser pipe for re-disintegration and re-entry to the riser pipe.

9. A method as claimed in claim 5 wherein the meal particles are supplied to the riser pipe while being subjected to a change of direction, by being passed through a pipe bend, whereby the heaviest of the particles follow paths having the largest radius of curvature of said bend and particles which are too heavy to be conveyed by the hot air, fall back into the bend along said paths, and wherein the heaviest of the particles are collected along said paths.

* * * * *